United States Patent [19]

Guzik et al.

[11] Patent Number: 4,719,322

[45] Date of Patent: Jan. 12, 1988

[54] RADIO HOUSING AND EXPANDABLE CHASSIS WITH INTEGRAL KEYPAD AND ACOUSTIC SPEAKER SEAL

[75] Inventors: Andrzej T. Guzik, Pompano Beach; Charles E. Kline, Sunrise; Irving H. Holden, Boca Raton, all of Fla.

[73] Assignee: Motorola, Inc., Schaumburg, Ill.

[21] Appl. No.: 866,014

[22] Filed: May 22, 1986

[51] Int. Cl.⁴ .................. G10K 5/04; H01H 13/70; H04B 1/38; H05K 5/00

[52] U.S. Cl. .................... 200/5 A; 181/141; 361/399; 455/89; 455/90; 455/351

[58] Field of Search .............. 200/5 A, 6 A, 304, 305; 361/397, 398, 399, 380, 417; 455/89, 90, 351; 181/141; 381/87, 88

[56] References Cited

U.S. PATENT DOCUMENTS

| | | | |
|---|---|---|---|
| 3,959,610 | 5/1976 | Finnegan et al. | 200/5 A |
| 4,081,631 | 3/1978 | Feder | 200/5 A |
| 4,117,279 | 9/1978 | Schoemer | 200/5 A |
| 4,225,970 | 9/1980 | Jaramillo et al. | 455/90 X |
| 4,231,098 | 10/1980 | Tanimoto | 361/399 X |
| 4,246,452 | 1/1981 | Chandler | 200/6 A X |

*Primary Examiner*—J. R. Scott
*Attorney, Agent, or Firm*—Martin J. McKinley; Daniel K. Nichols; Joseph T. Downey

[57] ABSTRACT

An expandable chassis includes a four sided frame with a central opening to receive a plate or "shield" which is allowed to move within the frame between two predetermined positions. Protuberances on the shield contact the frame and limit its inward movement while outward movement is limited by a spring clip on the shield that snaps into an aperture in the frame. Tabs on the frame support integrally formed spring fingers on the shield which tend to force the shield outward. A membrane switch contact assembly and a speaker are respectively attached to the inside and outside surfaces of the shield. By compressing the shield partially into the frame, the chassis assembly slides into a molded plastic housing. A rubber key actuator pad on the outside of the housing has a plurality of keys each having a protrusion or "actuator" that extends partially into an actuator hole in the housing. When the key is depressed, the actuator depresses and activates one of the switches in the membrane switch contact assembly. A plurality of speaker apertures extend through the housing, the membrane switch contact assembly, and the plate. An acoustic seal is formed between the plate and the housing because the spring fingers force the shield towards the housing until the membrane contacts the housing's inner wall. When the chassis is removed from the housing, testing and repair are facilitated because the keypad switches and speaker remain attached to and electrically connected to the chassis.

31 Claims, 3 Drawing Figures

RADIO HOUSING AND EXPANDABLE CHASSIS WITH INTEGRAL KEYPAD AND ACOUSTIC SPEAKER SEAL

BACKGROUND OF THE INVENTION

This invention relates to the field of housings and chassis and more particularly to those housings and chassis that incorporate keypads and speakers and that find application in portable radio transceivers.

Portable radio transceivers usually incorporate an outer housing into which a chassis is inserted. The chassis typically includes a four sided frame, open in the middle, with a front and a rear plate or "shield" covering the opening in the frame. The chassis usually contains the majority of the electronic components while the remaining components are either mounted to the outer housing directly or placed on modules which are attached to the outer housing.

For example, when a portable radio requires a key pad for the entry of data, the key pad and associated electronics are usually assembled into a module that is inserted into and covers an aperture in the outer housing. The keypad module is typically secured to the outer housing with screws and an electrical connector interconnects the keypad module and chassis electronics. The outer housing can be made waterproof by the use of a rubber "O" ring seal between the keypad module and the outer housing.

During initial testing of the chassis or during repair, the chassis is normally removed from the outer housing. With the prior art keypad module, the keypad switches and associated electronics must be separated from the chassis, thereby making it difficult to test or repair the radio as a complete integrated unit. If all the electrical components could be attached to the chassis, however, testing and repair would be facilitated because the chassis would be a complete functional unit, even though it was removed from the outer housing. Furthermore, the connector between the keypad module and chassis could be eliminated, thereby reducing cost and complexity. Therefore, it would be advantageous if all the keypad electrical components could be placed on the chassis.

In most prior art portable radios the speaker is mounted directly to the housing, thereby requiring a connector and cabling between the chassis and the speaker. In some radios, however, the speaker is mounted to the outside surface of the front shield of the chassis. An aperture with a diameter slightly smaller than the diameter of the speaker is formed in the front shield, and the speaker is inserted into the aperture until the speaker rim contacts the outside surface of the front shield. Before being inserted into the aperture, a thin film of a compliant gasket material is applied to the rim of the speaker. A sheet of foam is then glued to the inside surface of the front shield and to the speaker, thereby securing the speaker to the front shield. The front shield is inserted into the frame, however, it is not secured to the frame in anyway, but is allowed to "float". The front shield is electrically "grounded" to the frame by two spring fingers which are soldered to one corner of the frame. The free ends of the spring fingers electrically contact the inside surface of the front shield.

When the chassis (which includes the frame, and front and rear shields) is inserted into the outer housing, the foam compresses forcing the gasket material on the rim of the speaker against the inside surface of the outer housing. When the chassis is completely inserted into the housing, the speaker is positioned over a speaker grille in the outer housing, and the gasket material, which is held in place by the compressed foam, forms an acoustic seal between the speaker and the outer housing. The acoustic seal maintains the sound pressure level of the speaker by preventing the loss of acoustic energy through any gap that may have existed between the speaker rim and the outer housing.

One disadvantage of the prior art speaker system is that the foam can lose its resiliency over time and particularly at low temperatures. With the resiliency gone, the speaker is no longer held against the inside surface of the outer housing and the acoustic seal is lost, thereby decreasing the amount of sound energy transmitted through the speaker grille. Another disadvantage is that before the chassis is inserted into the outer housing, the front shield is not restrained within the frame and must be held in place by the person assembling the radio in order to insert the chassis in the outer housing. It would be desirable if the front shield could be restrained within the frame, but still be allowed to move within well defined limits. Furthermore, to reduce manufacturing costs and complexity, it would be advantageous if the step of soldering the grounding fingers to the corner of the frame could be eliminated.

SUMMARY OF THE INVENTION

Briefly, in one embodiment of the invention a housing and chassis assembly with integral keypad includes a plate and a switch contact assembly positioned on the plate. The switch contact assembly has at least one switch. A housing is included that has an aperture in alignment with the switch. An actuator pad is positioned on the housing. The actuator pad has at least one key wherein the key has a switch actuator in alignment with and for insertion into the aperture in the housing. Also included is a forcing means for applying a force to the plate whereby the switch contact assembly is held in contact with the housing.

In another embodiment, a housing and chassis assembly with integral keypad and acoustic speaker seal includes a plate that has first and second surfaces and at least one speaker aperture. A membrane switch contact assembly having at least one speaker aperture and one switch is attached to the first surface of the plate. A housing is included which also has at least one speaker aperture. The speaker apertures of the plate, the membrane switch contact assembly, and the housing are in substantial alignment. The speaker is mounted to the second side of the plate over the speaker aperture. To create an acoustic seal between the plate and the housing, a forcing means is included for applying a force to the plate whereby the switch membrane contact assembly is held in contact with the housing.

In still another embodiment, a housing and chassis assembly with integral keypad and acoustic speaker seal includes a conductive plate that has first and second surfaces and at least one speaker aperture. The conductive plate also has a plurality of spring fingers integrally formed with the plate. A membrane switch contact assembly is attached to the first surface of the plate and includes at least one switch and one speaker aperture. A housing is included that also has at least one speaker aperture. The speaker apertures of the plate, the membrane switch contact assembly, and the housing are in substantial alignment. The housing also includes at least one actuator aperture positioned over the switch of the membrane switch contact assembly. An acutator pad is positioned on the housing. The actuator pad has at least one key wherein the key has a switch actuator in alignment with and for insertion into the actuator aperture of the housing. A speaker is mounted to the second side of the plate and positioned over the speaker aperture of the plate. A conductive frame has a central opening for receiving the plate and includes integrally formed support means for supporting the spring fingers. Also included is a means for captivating the plate in the frame and for restricting the travel of the plate within the frame between predetermined first and second positions. An acoustic seal is formed between the plate and the housing because the spring fingers hold the membrane switch contact assembly against the housing. The spring fingers and the support means electrically connect the plate to the frame.

DESCRIPTION OF THE PREFERRED EMBODIMENTS

Figure 1:
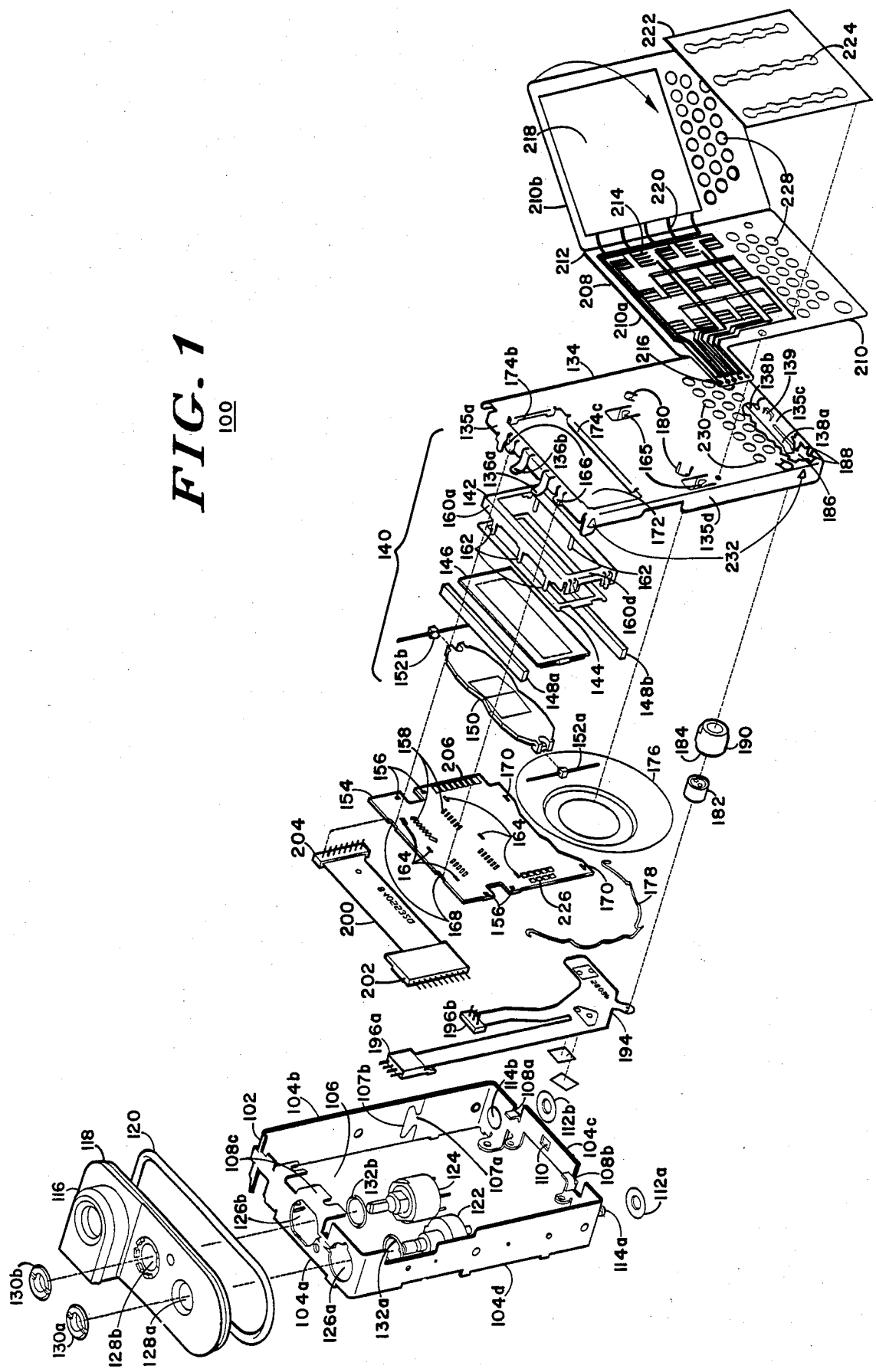
FIG. 1 is an exploded perspective view of the present invention.

Referring to FIG. 1, wherein the chassis assembly 100 is illustrated, a conductive frame 102 has four substantially perpendicular sides 104a, b, c, and d surrounding a central opening 106. Frame 102 is preferably constructed by stamping a 1 millimeter thick nickel-silver sheet, forming the stamped part into a substantially parallelepiped shape, welding ends 107a and 107b together, and then tin plating the resulting frame. Tabs 108a, b, and c are integrally formed with frame 102 during the stamping and forming process. Tabs 108a and 108b are formed on side 104 while tab 108c is formed on side 104a. An aperture 110, also integrally formed with frame 102, is positioned on side 104c. Seal washers 112a and 112b are respectively positioned over studs 114a and 114b which outwardly protrude from bottom side 104c.

A control head 116 is positioned over side 104a of frame 102 and includes a circumferential groove 118 into which a rubber O-ring 120 is inserted. Control head 116 is preferably constructed from PC-PET blended polycarbonate-polyester, such as Mobay Chemical Corporation's "Makroblend DP4-1357", although other materials may also be suitable. Controls 122 and 124 are respectively inserted into holes 126a and 126b of frame 102, and holes 128a and 128b of control head 116. Retaining nuts 130a and 130b, and washers 132a and 132b secure controls 122 and 124 to frame 102 and control head 116, thereby attaching frame 102 to control head 116. Additional screws may also be utilized to directly secure frame 102 to control head 116.

A plate or shield 134 is preferably constructed by stamping a 0.5 millimeter thick nickel-silver sheet, forming the resulting part, and then tin plating. Shield 134 has four integrally formed sides which are substantially perpendicular to its front surface; top side 135a, bottom side 135c and left side 135d are visible in the figure, but the right side, while similar to those illustrated, is not shown in the drawings. (Ordinarily, side 135a would not be visible in FIG. 1, however, a small section of the front surface of shield 134 immediately below speaker aperture 230 has been cut away to expose spring fingers 138a and b, captivating clip 139 and the inside surface of side 135c.) Spring fingers 136a, 136b, 138a and 138b, and captivating clip 139 are also integrally formed with shield 134 during the stamping and forming process. Spring fingers 138a and 138b are each approximately 15 millimeters long and are attached to shield 134 at the center of the rear edge of side 135c. Spring fingers 138a and 138b are substantially perpendicular to side 135c and flex in a direction parallel to side 135c. Captivating clip 139 is also attached to shield 134 near the rear edge of side 135c and the front edge of the clip projects down, allowing it to flex in a direction parallel to side 135d.

A display assembly 140 includes a bezel 142, an insulator 144, a liquid crystal display (LCD) 146, two elastomeric connectors 148a and 148b, a light guide 150 and two light emitting diodes (LED's) 152a and 152b. Bezel 142 is also a tin plated stamped and formed nickel-silver part which is constructed in a similar manner as shield 134. LCD 146, elastomeric connectors 148a and 148b, light guide 150 and LED's 152a and 152b are well known in the art.

Light guide 150 and LED's 152a and 152b are attached to a printed circuit board 154 by inserting the LED's into appropriate holders located at opposite ends of the light guide and soldering their electrical leads to four printed circuit terminals 156. Light guide 150 and LED's 152a and 152b provide supplemental illumination for LCD 146 in the event that ambient light intensity is insufficient to directly illuminate the LCD.

The rear surface of printed circuit board 154 (not visible in FIG. 1) has surface mounted chip carriers which contain integrated circuits suitable for decoding and driving LCD 146. Elastomeric connectors 148a and 148b couple the appropriate display signals to LCD 146 by interconnecting two rows of gold plated contacts 158 on printed circuit board 154 with contacts on the rear surface of the LCD (not visible in FIG. 1).

Bezel 142 has four sides which are integrally formed with the bezel and are substantially perpendicular to its front surface; top side 160a and left side 160d are visible in the figure, but the bottom and right sides, while similar to those illustrated, are not shown in the drawings. The top and bottom sides of bezel 142 each have three bezel retaining tabs 162 (only five retaining tabs are visible in FIG. 1) integrally formed with and protruding from the rear of bezel 142. To attach bezel 142 to printed circuit board 154, bezel retaining tabs 162 are twisted or bent after being inserted into corresponding slots 164 in the printed circuit board. Bezel 142 attaches LCD 146, elastomeric connectors 148a and 148b, and insulator 144 to printed circuit board 154.

Board retaining tabs 165 are integrally formed with front shield 134 and are substantially perpendicular to its front surface. Two printed circuit board retaining clips 166, also integrally formed with shield 134, mate with notches 168 of printed circuit board 154. Printed circuit board 154 is attached to front shield 134 by inserting retaining tabs 165 into printed circuit board slots 170 and then snapping the board under retaining clips 166 until the clips seat in notches 168. Front shield 134 has a display aperture 172 with four sides which are integrally formed around the perimeter of the aperture and are substantially perpendicular to the front surface of the shield; the right 174b and bottom 174c aperture sides are visible in the figure, but the top and left sides, while similar to those illustrated, are not visible in the drawings. When printed circuit board 154 is attached to shield 134, bezel 142 is inserted into aperture 172, such that the sides of the bezel are adjacent, if not in contact with the sides of the aperture.

A permanent magnet speaker 176 is positioned on the rear surface of shield 134 and attached to the shield by placing a steel spring retaining clip 178 over the rear rim of the speaker and behind speaker retaining tabs 180, which are also integrally formed with the shield. A microphone 182 and a silicon rubber boot 184 are inserted into a microphone aperture 186 in front shield 134 and are retained by integrally formed fingers 188 which seat themselves in a circumferential groove 190 in the boot. Speaker 176 and microphone 182 are electrically connected to a main radio board (not illustrated) through flex circuit 194 and connectors 196a and 196b. Printed circuit board 154 is electrically connected to the main radio board through flex circuit 200 and connectors 202 and 204. Connector 204 has a plurality of pins which mate with sockets 206 on printed circuit board 154.

A membrane switch contact assembly 208 includes a flexible insulating sheet 210, preferably a 75 micrometer thick polyimide film, wherein a lower layer 210a and an upper layer 210b are formed when the sheet is folded along line 212. Plated on lower and upper layers 210a and 210b is 35 micrometers of copper which is etched to form conductors and 15 switch contacts, for example switch contact 214. Each switch contact includes two sets of 5 interstitial fingers, the first set of fingers projecting in one direction and the second set projecting in the opposite direction and positioned in the space between the first set of fingers. The 15 switch contacts are electrically connected in matrix fashion, that is, each switch contact in a particular row has its first set of fingers connected to one of five row conductors and each switch in a particular column has its second set of fingers connected to one of three column conductors. The row and column conductors are each routed to one of eight pins on a male flex circuit connector 216. A common switch terminal 218 is formed by screen printing a conductive ink on upper film layer 210b. Common switch terminal 218 is electrically connected to a ninth pin on flex circuit connector 216 by copper conductors 220. An insulator sheet 222, preferably a 125 micrometer thick polyimide film, is bonded between lower and upper layers 210a and 210b and includes 15 switch contact apertures, for example aperture 224, in alignment with the corresponding switch contact on lower layer 210a.

Switch contact assembly 208 is bonded to the front surface of shield 134 using a 50 micrometer thick acrylic based adhesive. Although a membrane switch contact assembly is preferred, other switch contact assemblies well known in the art may also be suitable. Connector 216 is then inserted into connector 226 on the rear surface of printed circuit board 154. To permit the transmission of sound from speaker 176, a plurality of speaker apertures 228 are formed in switch membrane contact assembly 208. Speaker apertures 228 are substantially aligned with speaker apertures 230 in front shield 134.

In operation, pressure is applied to the outside surface of flexible layer 210b over a selected switch contact, for example switch contact 214. This pressure causes common terminal 218 to be depressed into aperture 224 until it contacts switch contact 214. Upon contact, common terminal 214 electrically shorts the two sets of interstitial fingers of switch contact 214, thereby causing a short between one of the row conductors and one of the column conductors that are connected to flex connector 216. This short is then detected by the integrated circuits on the rear side of printed circuit board 154.

Shield 134 is captivated within frame 102 by inserting spring fingers 136a and 136b under a lip (not visible in FIG. 1) of control head 116 and snapping captivating clip 139 into aperture 110 of frame 102. Captivating clip 139 restricts the outward (forward) travel of shield 134 relative to frame 102 to a first position when the edge of the clip contacts the forward perimeter of aperture 110. The inward (rearward) travel of shield 134 relative to frame 102 is restricted to a second position when three integrally formed protuberances 232 on shield 134 (only two are visible in FIG. 1, the third is formed on the right side of shield 134) contact the forward edge of the frame. Thus, captivating clip 139, aperture 110, and protuberances 232 provide a means for captivating shield 134 in frame 102 and for restricting the travel of the shield between two predetermined positions.

When shield 134 is captivated within frame 102, spring fingers 136a and 136b are supported by tab 108c, and spring fingers 138a and 138b are respectively supported by tabs 108b and 108a. Thus, tabs 108a, b, and c provide a means for supporting spring fingers 136a, 136b, 138a, and 138b. As shield 134 is attached or captivated to frame 102, the spring fingers are flexed and placed under tension such that they tend to force shield 134 outward. This outward movement of shield 134 is restricted, however, when captivating clip 139 contacts the forward perimeter of aperture 110. (Because spring fingers 136a and 136b are positioned under the lip in control head 116, the movement of the upper end of shield 134 is also restricted.) Because the spring fingers and the supporting tabs are electrically conductive, shield 134 is electrically connected or "grounded" to frame 102.

Figure 2:
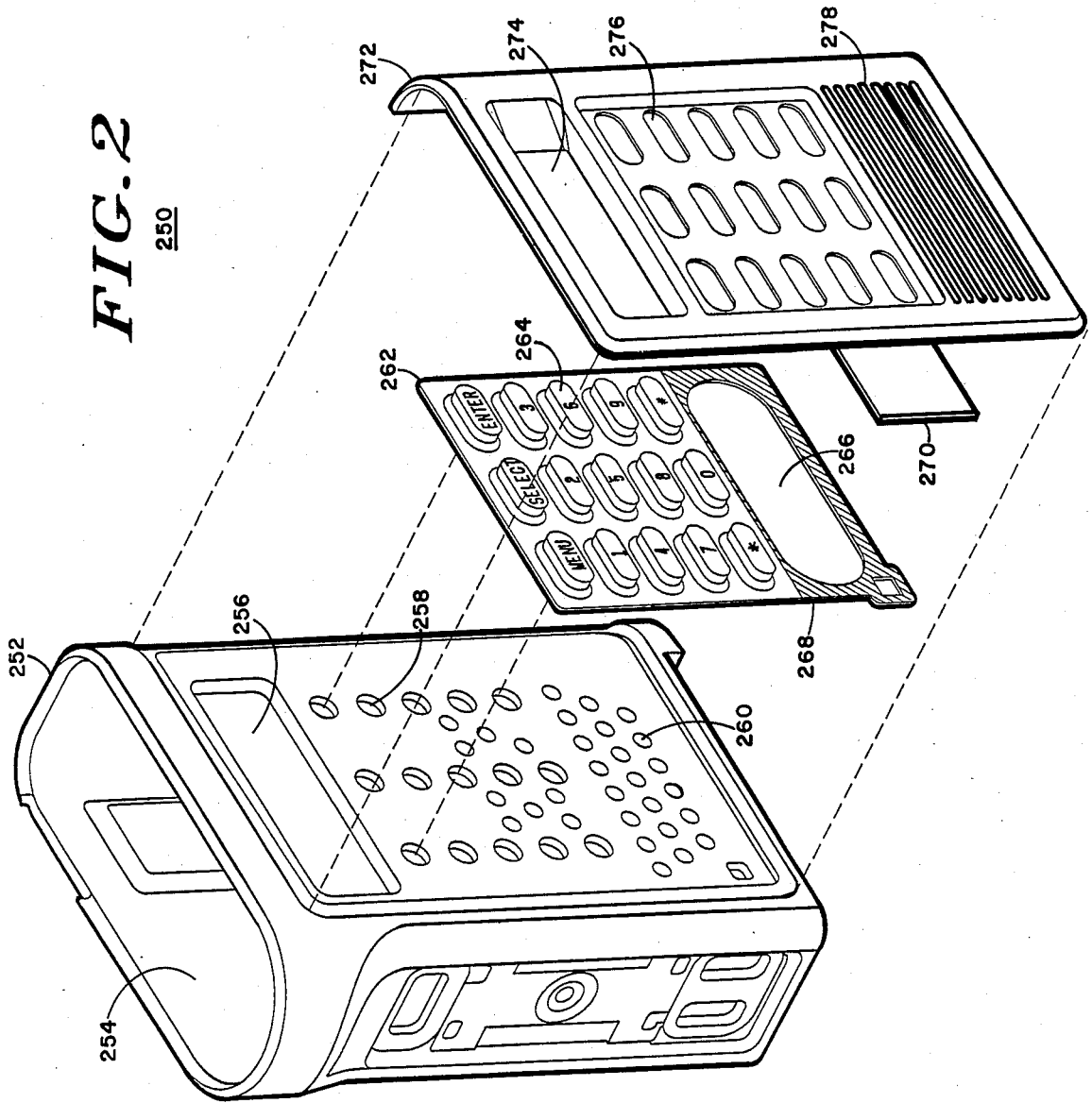
FIG. 2 is an exploded perspective view of the housing, actuator pad and cover.

Referring to FIG. 2, wherein the housing assembly 250 is illustrated, an outer housing 252 has a cavity 254 for receiving chassis assembly 100. Outer housing 252 is preferably molded from a PC-PET blended polycarbonate-polyester material such as Mobay Chemical Corporation's "Makroblend DP4-1357". Housing 252 has a display window 256 and 15 actuator apertures, for example actuator aperture 258. Outer housing 252 also has a plurality of speaker apertures 260 in substantial alignment with speaker apertures 228 of membrane switch contact assembly 208 and speaker apertures 230 of front shield 134.

An elastomeric actuator pad 262, preferably constructed from silicon rubber, has 15 keys, for example key 264, that are integrally molded with the pad. Each key has a protrusion or "actuator" (not visible in FIG. 2) extending from the rear surface of the pad that is partially inserted into the corresponding actuator aperture in housing 252. This will be described in greater detail below in connection with FIG. 3. A speaker aperture 266 is surrounded by adhesive area 268 which is preferably covered with a silicon based pressure sensitive adhesive such as Shin-Etsu Corporation's SRA#100 adhesive. A thin membrane 270, preferably a thin sheet of polyurethane, is adhered to adhesive area 268.

An actuator pad cover 272, preferably constructed from the same materials as housing 252, has a display window 274 and 15 key apertures, for example key aperture 276, for receiving the keys of actuator pad 262. Cover 272 also has a speaker grille 278 which will be described in greater detail below in connection with FIG. 3. Cover 272 is positioned over actuator pad 262 and bonded to housing 252. When cover 272 is bonded to housing 252, membrane 270 is compressed against the rear surface of the cover whereby it forms a water tight seal to prevent moisture from entering the radio through speaker grille 278.

To insert chassis assembly 100 into housing 252, shield 134 is temporarily compressed into frame 102 until protuberances 232 contact the forward edge of the frame. The compressed chassis assembly 100 is then inserted into cavity 254 of housing 252 and then allowed to expand until switch contact assembly 208 contacts the inside surface of the housing. The switch contact assembly is held against the inside wall of the housing by spring fingers 136a, 136b, 138a, and 138b which provide a forcing means for applying a force to shield 134. With switch contact assembly 208 held firmly against the inside wall of housing 252, an acoustic seal is formed between shield 134 and the housing. This acoustic seal prevents the loss of acoustic energy through the potential space between the shield and the housing.

Figure 3:
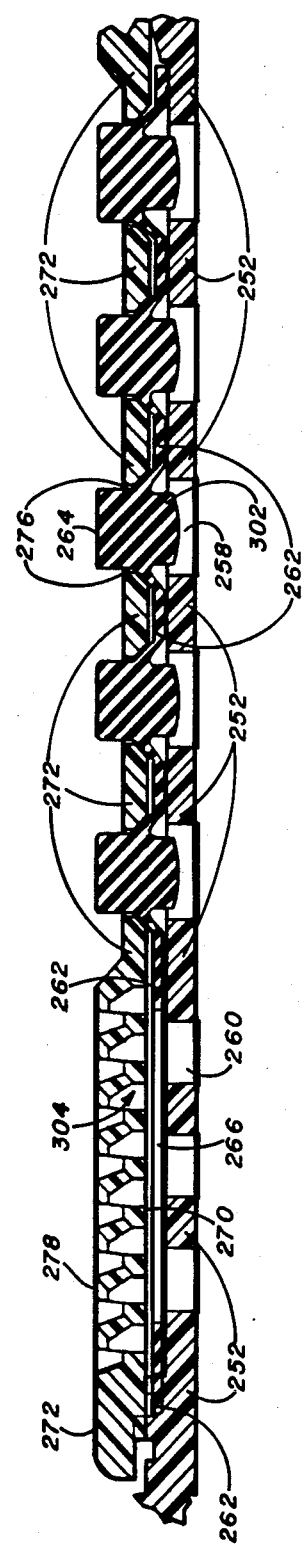
FIG. 3 is a cross sectional view of the housing, actuator pad and cover.

In FIG. 3, a cross-sectional view of cover 272, actuator pad 262, and housing 252 is illustrated. Each key of actuator pad 262 has a protrusion or "actuator" that partially (when the key is not depressed) protrudes into the corresponding actuator aperture of housing 252. For example, actuator 302 partially protrudes into actuator aperture 258. As previously described, when chassis assembly 100 is inserted into housing 252, switch contact assembly is held against the inside surface of housing 252. When key 264 is depressed, actuator 302 is forced completely through actuator hole 258 whereby it contacts and activates switch contact 214 of switch assembly 208.

Speaker grille 278 has a plurality of speaker apertures 304 which are preferably skewed to prevent the insertion of extraneous objects through the speaker grille which could potentially damage membrane 270 and speaker 176.

Referring to FIGS. 1 and 2, note that chassis assembly 100 is a complete functional unit; no components attached to housing assembly 250 are necessary for the radio to properly function. For example, key actuator pad 262 is non-essential to the operation of switch contact assembly 208. The individual switch contacts, for example switch contact 214, can be activated directly by pressing the front surface of layer 210b immediately over the area of the desired switch. To assist repair personnel, the same characters that appear on the keys of actuator pad 262, can also be printed on the front surface of layer 210b over the corresponding switch contacts.

We claim as our invention:

1. A housing and chassis assembly with integral keypad, comprising in combination:
   a plate;
   a switch assembly unit attached to said plate and having at least one switch;
   a housing having at least one aperture in alignment with said switch;
   an actuator pad attached to the outside of said housing and having at least one key wherein said key has a switch actuator in alignment with and for insertion into said housing aperture, said switch actuator contacts said switch assembly unit and activates said switch when said key is depressed; and
   spring means for applying a force to said plate whereby said switch assembly unit is held in contact with the inside of said housing.

2. The assembly of claim 1, wherein said spring means includes a plurality of spring fingers integrally formed with said plate.

3. The assembly of claim 2, further comprising a frame having a central opening for receiving said plate, said frame including support means, integrally formed with said frame, for supporting said spring fingers.

4. The assembly of claim 1, further comprising:
   a conductive frame having a central opening for receiving said plate; and
   wherein said plate and said spring means are conductive, and said spring means is electrically connected between said plate and said frame.

5. The assembly of claim 1, further comprising:
   a frame having a central opening for receiving said plate; and
   means for captivating said plate in said frame and for restricting the travel of said plate within said frame between predetermined first and second positions.

6. The assembly of claim 5, wherein said captivating and restricting means includes:
   protuberances, integrally formed with said plate, whereby said protuberances contact said frame when said plate is moved to said first position;
   a clip integrally formed with said plate; and
   an aperture formed in said frame and suitable for receiving said clip, whereby said clip contacts said frame at the perimeter of said aperture when said plate is moved to said second position.

7. The assembly of claim 5, wherein:
   said spring means includes a plurality of spring fingers integrally formed with said plate; and
   said frame includes support means, integrally formed with said frame, for supporting said spring fingers.

8. The assembly of claim 7, wherein said plate with said integral spring fingers and said frame with said support means are conductive, whereby said plate is electrically connected to said frame.

9. A housing and chassis assembly with integral keypad and acoustic speaker seal, comprising in combination:
   a plate having first and second surfaces and at least one speaker aperture;
   a flexible circuit type switch assembly unit attached to said first surface of said plate and including at least one switch and at least one speaker aperture;
   a housing having at least one speaker aperture wherein the speaker apertures of said plate, said flexible circuit type switch assembly unit, and said housing are in substantial alignment;
   a speaker mounted to said second side of said plate and positioned over said speaker aperture of said plate; and
   spring means for applying a force to said plate whereby said switch assembly unit is held in contact with the inside of said housing, thereby creating an acoustic seal between said plate and said housing.

10. The assembly of claim 9, wherein said spring means includes a plurality of spring fingers integrally formed with said plate.

11. The assembly of claim 10, further comprising a frame having a central opening for receiving said plate, said frame including support means, integrally formed with said frame, for supporting said spring fingers.

12. The assembly of claim 9, further comprising:
a conductive frame having a central opening for receiving said plate; and
wherein said plate and said spring means are conductive, and said spring means is electrically connected between said plate and said frame.

13. The assembly of claim 9, further comprising:
an actuator pad attached to the outside of said housing and having at least one key wherein each key has a switch actuator; and
wherein said housing has an actuator aperture for receiving said switch actuator, said actuator aperture being positioned over said switch, said switch actuator contacts said switch assembly unit and activates said switch when said key is depressed.

14. The assembly of claim 9 further comprising:
a frame having a central opening for receiving said plate; and
means for captivating said plate in said frame and for restricting the travel of said plate within said frame between predetermined first and second positions.

15. The assembly of claim 14, wherein said captivating and restricting means includes:
protuberances, integrally formed with said plate, whereby said protuberances contact said frame when said plate is moved to said first position;
a clip integrally formed with said plate; and
an aperture formed in said frame and suitable for receiving said clip, whereby said clip contacts said frame at the perimeter of said aperture when said plate is moved to said second position.

16. The assembly of claim 14, wherein:
said spring means includes a plurality of spring fingers integrally formed with said plate; and
said frame includes support means, integrally formed with said frame, for supporting said spring fingers.

17. The assembly of claim 16, wherein said plate with said integral spring fingers and said frame with said support means are conductive, whereby said plate is electrically connected to said frame.

18. the assembly of claim 17, further comprising:
an actuator pad attached to the outside of said housing and having at least one key wherein each key has a switch actuator; and
wherein said housing has an actuator aperture for receiving said switch actuator, said actuator aperture being positioned over said switch, said switch actuator contacts said switch assembly unit and activates said switch when said key is depressed.

19. A housing and chassis assembly with integral keypad and acoustic speaker seal, comprising in combination:
a conductive plate having first and second surfaces and at least one speaker aperture, and including a plurality of spring fingers integrally formed with said plate;
a flexible circuit type switch assembly unit attached to said first surface of said plate and including at least one switch and at least one speaker aperture;
a housing having at least one speaker aperture wherein the speaker apertures of said plate, said switch assembly unit, and said housing are in substantial alignment, said housing including at least one actuator aperture positioned over said switch;
an actuator pad attached to the outside of said housing and having at least one key wherein said key has a switch actuator in alignment with and for insertion into said actuator aperture of said housing, said switch actuator contacts said switch assembly unit and activates said switch when said key is depressed;
a speaker mounted to said second side of said plate and positioned over said speaker aperture of said plate;
a conductive frame having a central opening for receiving said plate and including support means, integrally formed with said frame, for supporting said spring fingers; and
means for captivating said plate in said frame and for restricting the travel of said plate within said frame between predetermined first and second positions;
whereby said spring fingers hold said switch assembly unit against the inside of said housing, thereby forming an acoustic seal between said plate and said housing, and said plate is electrically connected to said frame by said spring fingers and said support means.

20. A housing and chassis assembly, comprising in combination:
a housing having at least one aperture;
an actuator pad attached to the outside of said housing and having at least one key wherein said key has a switch actuator in alignment with and for insertion into said housing aperture;
an expandable chassis inserted into said housing and including a frame, a plate movably attached to said frame, a switch assembly unit attached to the outside of said plate and having at least one switch in alignment with said housing aperture, and spring means for holding said switch assembly unit in contact with the inside of said housing;
whereby said switch actuator contacts said switch assembly unit and activates said switch when said key is depressed, and said expandable chassis is slidably removable from said housing in a direction parallel to said plate.

21. The assembly of claim 20, wherein said spring means includes a plurality of spring fingers integrally formed with said plate and a plurality of support means integrally formed with said frame for supporting said spring fingers.

22. The assembly of claim 20, wherein said frame, said plate and said spring means are conductive, and said spring means electrically connects said plate to said chassis, whereby said expandable chassis functions as an electromagnetic shield.

23. The assembly of claim 20, further comprising means for restricting the movement of said plate relative to said frame between predetermined first and second positions.

24. The assembly of claim 23, wherein said restricting means includes:
protuberances integrally formed with said plate, whereby said protuberances contact said frame when said plate is moved to said first position;
a clip integrally formed with said plate; and
an aperture formed in said frame and suitable for receiving said clip, whereby said clip contacts said frame at the perimeter of said aperture when said plate is moved to said second position.

25. The assembly of claim 23, wherein said frame, said plate and said spring means are conductive and said spring means electrically connects said plate to said chassis, whereby said expandable chassis functions as an electromagnetic shield.

26. A housing and chassis assembly, comprising in combination:
   a housing having at least one speaker aperture;
   an expandable chassis inserted into said housing and including a frame, a plate movably attached to said frame and having first and second surfaces and at least one speaker aperture, a flexible circuit type switch assembly unit attached to said first surface of said plate and including at least one switch and at least one speaker aperture, a speaker mounted to said second side of said plate over said speaker aperture of said plate, and spring means for holding said switch assembly unit in contact with the inside of said housing;
   whereby an acoustic seal is formed between said plate and said housing and said expandable chassis is slidably removable from said housing in a direction parallel to said plate.

27. The assembly of claim 26, wherein said spring means includes a plurality of spring fingers integrally formed with said plate and a plurality of support means integrally formed with said frame for supporting said spring fingers.

28. The assembly of claim 26, wherein said frame, said plate and said spring means are conductive and said spring means electrically connects said plate to said chassis, whereby said expandable chassis functions as an electromagnetic shield.

29. The assembly of claim 26, further comprising an actuator pad attached to the outside of said housing and having at least one key wherein each key has a switch actuator; and
   wherein said housing has an actuator aperture for receiving said switch actuator, said actuator aperture being positioned over said switch;
   whereby said switch actuator contacts said switch assembly unit and activates said switch when said key is depressed.

30. The assembly of claim 26, further comprising means for restricting the movement of said plate relative to said frame between two predetermined positions.

31. The assembly of claim 30, wherein said frame, said plate and said spring means are conductive and said spring means electrically connects said plate to said chassis, whereby said expandable chassis functions as an electromagnetic shield.

* * * * *